United States Patent [19]
Kim

[11] Patent Number: 5,699,473
[45] Date of Patent: Dec. 16, 1997

[54] METHOD FOR RECORDING AND REPRODUCING INTERCODED DATA USING TWO LEVELS OF ERROR CORRECTION

[75] Inventor: Tae-eung Kim, Yongin-gun, Rep. of Korea

[73] Assignee: Samsung Electronics Co., Ltd., Kyungki-Do, Rep. of Korea

[21] Appl. No.: 731,006

[22] Filed: Oct. 9, 1996

[30] Foreign Application Priority Data

Oct. 10, 1995 [KR] Rep. of Korea .............. 95-34755

[51] Int. Cl.$^6$ .............................. H04N 5/91; H04N 5/917
[52] U.S. Cl. ............................................ 386/67; 386/109
[58] Field of Search ................................. 386/109, 111, 386/112, 67, 68, 6, 7, 33, 27; 348/384; 360/32; H04N 5/91, 5/917

[56] References Cited

U.S. PATENT DOCUMENTS

5,579,183  11/1996  Van Gestel et al. ............. 360/48
5,596,581   1/1997  Saeijs et al. ................... 370/394

*Primary Examiner*—Robert Chevalier
*Attorney, Agent, or Firm*—Sughrue,Mion,Zinn,Macpeak & Seas, PLLC

[57] ABSTRACT

A digital videotape recording and reproducing method increases the error correction capability for normal reproduction data by using an ECC3 area allocated in an intercoded signal during an outer coding procedure. The recording method divides the data into normal and trick reproduction data, and allocates an ECC3 area in a predetermined position of a data sync block in which the normal reproduction data area is recorded, and includes the steps of: first outer-code error-correction coding of the normal reproduction data after replacing the trick reproduction data and the ECC3 area data with a predetermined data pattern, thereby generating and adding outer parity data; second outer-code error-correction coding of the normal reproduction data after replacing the trick reproduction data coded in the first outer-code error-correction coding step with another predetermined data pattern thereby generating and adding ECC3 error-correction information in the ECC3 area; innercode error-correction coding of each of the normal and the trick reproduction data coded by the second outer-code error-correction coding step; and modulating the normal and trick reproduction data and ECC3 area data, coded by the inner-code error-correction coding step to record that data on a videotape.

12 Claims, 8 Drawing Sheets

METHOD FOR RECORDING AND REPRODUCING INTERCODED DATA USING TWO LEVELS OF ERROR CORRECTION

BACKGROUND OF THE INVENTION

1. Field of the Invention

The present invention relates to a digital videotape recording and reproduction method. More particularly, it relates to a digital videotape recording and reproduction method having improved error correction capability during a normal reproduction operation, employed in a digital video cassette recorder which records and reproduces advanced television (ATV) or digital video broadcasting (DVB) signals.

2. Description of the Related Art

A commercial digital video cassette recorder (DVCR) for recording and reproducing ATV or DVB signals on a digital videotape has been developed and studies are currently underway relating to a recording format for a specific reproduction method which satisfies the picture quality and the cost efficiency of a standard definition video cassette recorder (SD-VCR) for recording and reproducing ATV signals.

An ATV signal is transmitted to an SD-VCR as a transport packet having an MPEG-2 structure recommended by the Moving Picture Experts Group (MPEG).

Figure 1:
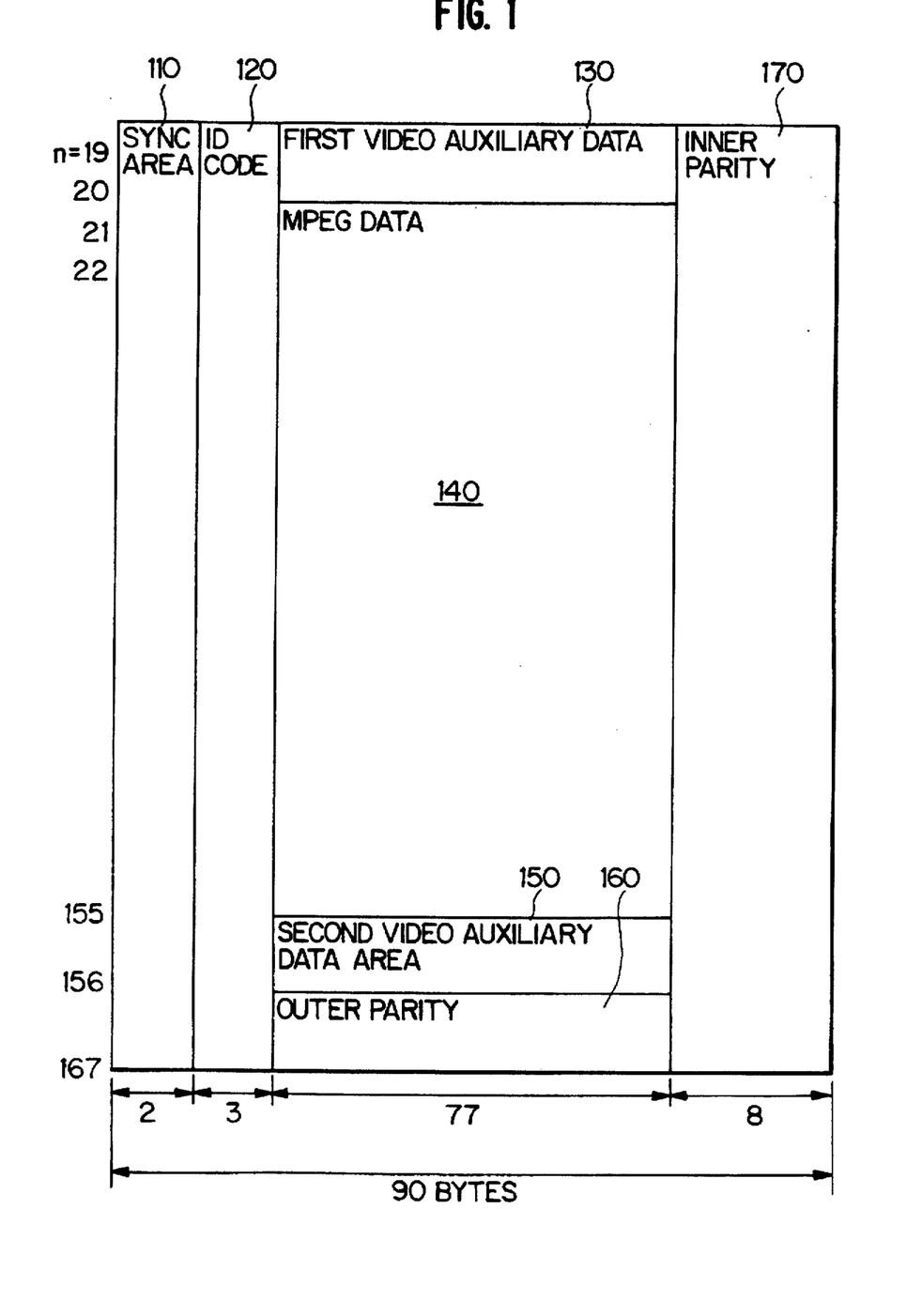
FIG. 1 shows a structure of data sync blocks of a video sector in a conventional standard definition—video cassette recorder (SD-VCR)

FIG. 1 shows a specific structure of data sync blocks of a video sector in a conventional standard definition—video cassette recorder (SD-VCR). The video sector consists of sync blocks n=19 and 20 as first video auxiliary data area 130, sync blocks n=21~155 as MPEG data area 140, a sync block n=156 as second video auxiliary data area 150, and sync blocks n=157~167 as outer parity area 160.

Each sync block consists of 2 bytes of sync area 110, 3 bytes of identification code 120, 77 bytes of data, and 8 bytes of inner parity 170 for an inner-code error-correction.

An SD-VCR signal is in the form of intraframe coded data and has an error-correction code (ECC) structure. In the ECC structure, a row code is called an inner code, having a (85,77) structure, and a column code called an outer code, having a (149,138) structure.

During recording, an outer-code error-correction coding operation is carried out for each column by adding 11 bytes of outer parity 160 to 138 bytes of an outer code, and then an inner-code error-correction coding operation is carried out for each row by adding 8 bytes of inner parity 170 to 77 bytes of an inner code.

During reproduction, an inner-code error-correction decoding operation is performed in which up to a maximum of 4 of 85 bytes which are in error for each sync block are corrected, then the sync block is transmitted by adding an error flag if all the errors are not corrected. In the outer-code error-correction decoding procedure up to 11 errors in the 149 bytes are corrected based on the error flag.

Also, in the SD-VCR signal, a frame is divided into segments each of which consists of 5 macroblocks, and the number of bits on a track is fixed by a segment unit. Since the number of bits is fixed for every 5 macroblocks, a trick reproduction is possible.

On the other hand, ATV and DVB signals are interframe coded to have an MPEG-2 structure, and normal and trick reproduction data areas for normal and trick reproduction data, respectively, exist separately in a video sector recorded according to the SD-VCR recording format.

Here, interframe coding is carried out for a group of picture (GOP) unit having 15 frames. Since the coding for the other frames except the intraframe is carried out only for the difference between the neighboring frames, an error occurring within a frame results in errors occurring in all frames within the corresponding GOP.

Therefore, since ATV and DVB signals are coded using interframe coding, in an SD-VCR for recording and reproducing ATV and DVB signals there arises a problem in which those signals can be fatally damaged if an error occurs in the normal reproduction data of those signals.

SUMMARY OF THE INVENTION

Therefore, an object of the present invention is to provide a digital video recording method for improving the error correction capability of normal reproduction data during an SD-VCR outer coding operation, by using an ECC3 area additionally allocated for the normal-reproduction data error-correction of ATV and DVB signals.

Another object of the present invention is to provide a digital video reproduction method for improving the error correction capability of normal reproduction data during an outer coding SD-VCR operation, by reproducing using an ECC3 area additionally allocated for the normal-reproduction data error-correction of ATV and DVB signals.

To accomplish one of the objects discussed above, there is provided a method for recording on a videotape intercoded video data including picture data, which are supplied at a predetermined interval and capable of being independently decoded, by dividing the data into normal and trick reproduction data, and allocating an ECC3 area at a predetermined position in which the normal reproduction data is recorded, and storing error correction information relating to the normal reproduction data, comprising:

first outer-code error-correction coding of the normal reproduction data after setting the trick reproduction data and data in the ECC3 area with a first predetermined data pattern, thereby generating and adding first outer-code error-correction data to an outer parity area;

second outer-code error-correction coding of the normal reproduction data after setting the trick reproduction data coded in said first outer-code error-correction coding step and additional ECC3 area data to a second predetermined data pattern, thereby generating and adding second outer-code error-correction data to the ECC3 area;

inner-code error-correction coding each of the normal and the trick reproduction data coded by the first and second outer-code error-correction steps, thereby generating and storing inner-coded error correction data in an inner parity area; and modulating and recording the normal and trick reproduction data and ECC3 area data of the inner-coded error correction data at predetermined locations on a track of the videotape.

Also to accomplish one of the objects discussed above, there is provided a method for recording on a videotape intercoded video data including picture data, which are supplied at a predetermined interval and capable of being independently decoded, by dividing the data into normal and trick reproduction data, and allocating an ECC3 area at a predetermined position in which the normal reproduction data area is recorded, and storing error correction information relating to the normal reproduction data, comprising the steps of:

first outer-code error-correction coding of the normal reproduction data after setting the trick reproduction data with a first predetermined data pattern and then generating and adding first outer-code parity information in the ECC3 area;

second outer-code error-correction coding of the normal reproduction data after setting the trick reproduction data coded in said first outer-code error-correction coding step, and an data in the ECC3 area with a second predetermined data pattern, and then generating and adding outer parity information in an outer parity area;

inner-code error-correction coding of each of the normal and the trick reproduction data coded by the second outer-code error-correction coding step; and modulating and recording the normal and trick reproduction data and ECC3 area data, coded in the inner-code error-correction coding step in a predetermined location of a track on the videotape.

To accomplish the other one of the objects above, there is provided a digital videotape reproducing method for reproducing normal and trick reproduction data recorded in a video sector on a videotape, comprising:

inner-code error-correction decoding of each of the normal and trick reproduction data;

second outer-code error-correction decoding of the normal and trick reproduction data decoded in said inner-code correction decoding step after replacing the trick reproduction data with a first predetermined data pattern;

first outer-code error-correction decoding of the normal and trick reproduction data decoded in said second outer-code error-correction decoding step after replacing the trick reproduction data and data in an ECC3 area with a second predetermined data pattern; and mixing the normal and trick reproduction data decoded in said first outer-code error-correction coding step to output a video signal.

Also to accomplish the other one of the objects discussed above, there is provided a digital videotape reproducing method for reproducing normal and trick reproduction data recorded in a video sector on a videotape, comprising:

inner-code error-correction decoding of each of the normal and trick reproduction data;

first outer-code error-correction decoding of the normal and trick reproduction data decoded in said inner-code correction decoding step after replacing the trick reproduction data and the ECC3 area data with a first predetermined data pattern;

second outer-code error-correction decoding of the normal and trick reproduction data decoded in said first outer-code error-correction decoding step after replacing the trick reproduction data with a second predetermined data pattern; and mixing the normal and trick reproduction data decoded in said second outer-code error-correction coding step to output a video signal.

DETAILED DESCRIPTION OF THE PREFERRED EMBODIMENT

Figure 2:
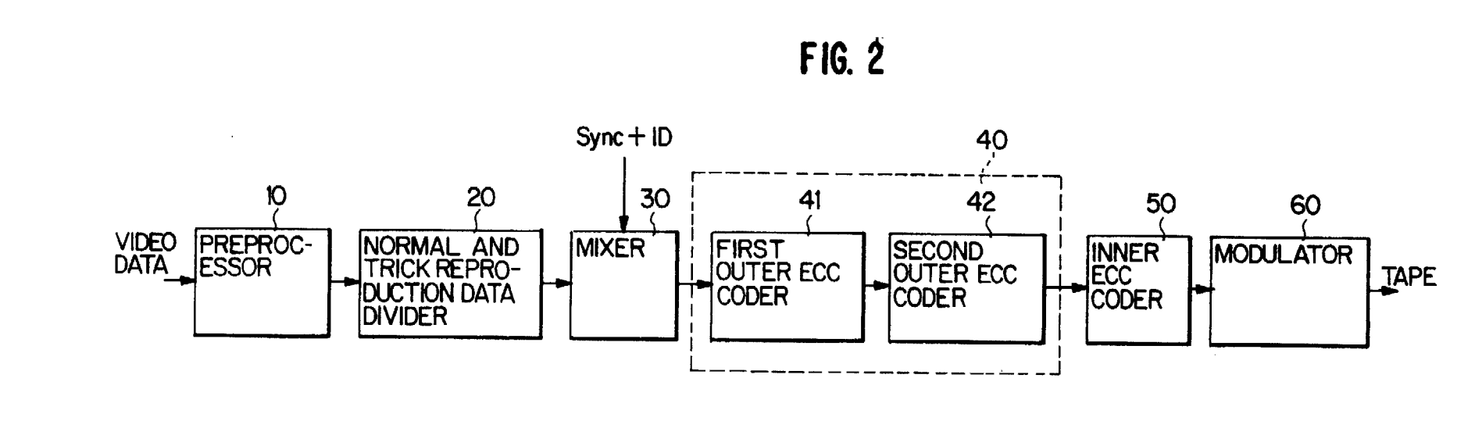
FIG. 2 is a block diagram of an ECC encoder for carrying out a digital videotape recording method according to an embodiment of the present invention.

An ECC encoder for carrying out a digital videotape recording method according to the present invention is shown, for example, as the ECC coder in FIG. 2. The ECC encoder shown in FIG. 2 includes a preprocessor 10 for isolating a transport packet from a transmitted packet, a normal and trick reproduction data divider 20 for dividing the packet received by preprocessor 10 into normal and trick reproduction data, a mixer 30 for mixing sync signals and identification codes (ID), an outer ECC coder 40 for performing outer-code error-correction coding, consisting of first and second outer ECC coders 41 and 42, respectively, an inner ECC coder 50 for performing inner-code error-correction coding, and a modulator 60 for modulating error-correction coded data to be recorded on a videotape.

Figure 3:
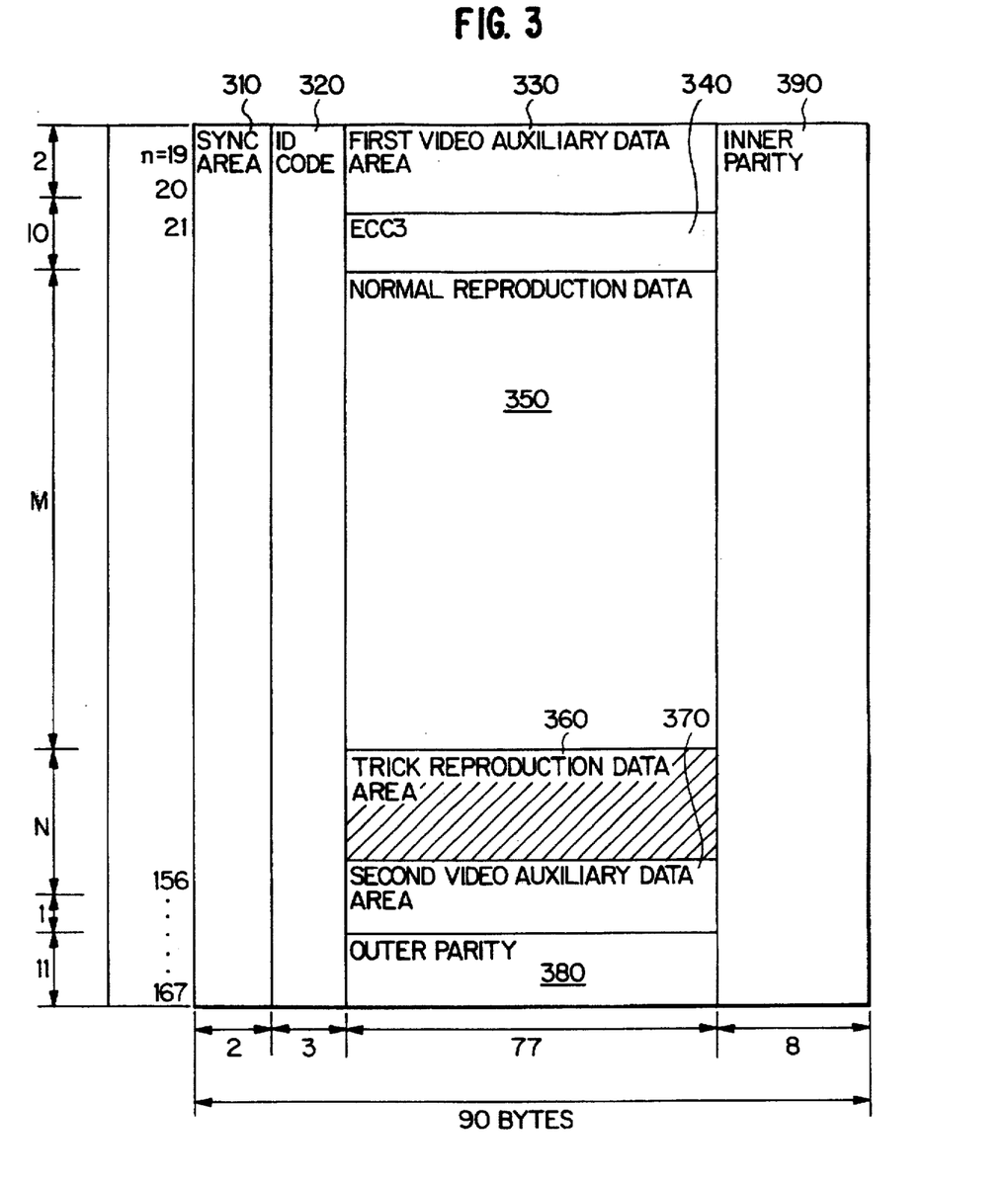
FIG. 3 shows a structure of data sync blocks in a video sector according to the present invention.

FIG. 3 shows a structure of data sync blocks in a video sector according to the present invention. Here, the data structure includes sync blocks (n=19 and 20) as a first video auxiliary data area 330, sync blocks (21~30) as an error-correction coding (ECC3) area 340, sync blocks (31~130) as a normal reproduction data area 350, sync blocks (131~155) as a trick reproduction data area 360, a sync block (156) as a second video auxiliary data area 370, and sync blocks (157~167) as an outer parity area 380.

Each sync block includes 2 bytes of sync data in a sync area 310, 3 bytes of an identification code 320, 77 bytes of data, and 8 bytes of inner parity information in an inner parity area 390 for inner-code error-correction coding.

Figure 4:
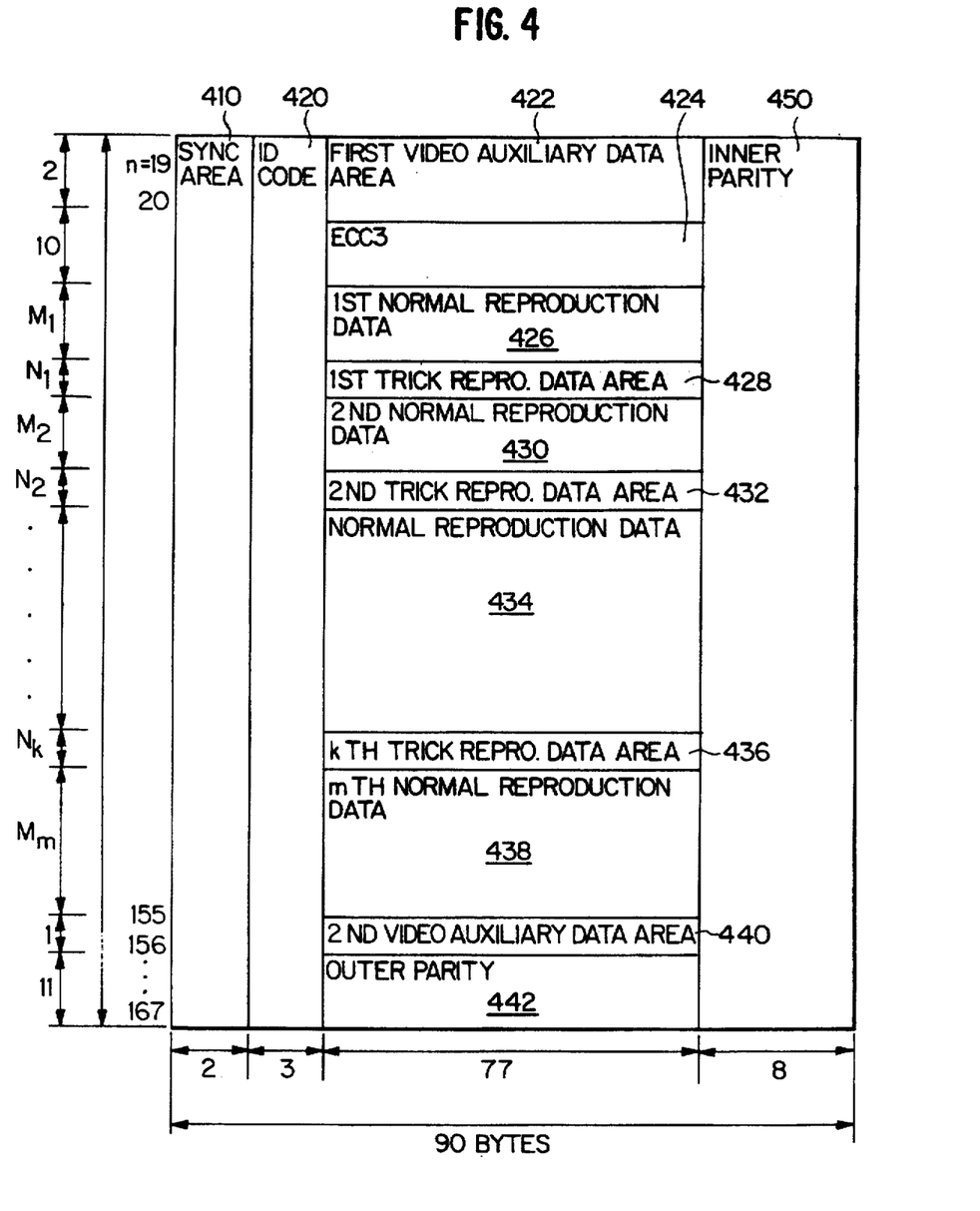
FIG. 4 shows another structure of data sync blocks in a video sector according to the present invention.

FIG. 4 shows another data sync block structure of a video sector according to the present invention. In FIG. 4, reproducing data area is subdivided into m normal and k trick reproduction data areas, respectively, where m and k are larger than zero. The size of each of these areas is $M_i$ and $N_j$, where $i=1 \ldots m$ and $j=1 \ldots k$, respectively, and where each area is larger than zero.

FIG. 4 includes sync blocks (n=19 and 20) as a first video auxiliary data area 422, N sync blocks as the first through kth trick reproduction data areas 428, 432 and 436 (i.e., $N_1 \ldots N_k$, where $N=N_1+N_2+\ldots +N_k$), sync blocks (21~30) as an error-correction coding (ECC3) area 424 for normal reproduction data areas 426, 430, 434 and 438, M sync blocks as the first through mth normal reproduction data areas 426, 430, 434 and 438 (i.e., $M_1 \ldots M_m$, where $M=M_1+M_2+\ldots +M_m$), a sync block (156) as a second video auxiliary data area 440, and sync blocks (157~167) as an outer parity area 442, in which M+N=125.

Each sync block includes 2 bytes of sync data from a sync area 410, 3 bytes of an identification code (ID code) 420, 77 bytes of data, and 8 bytes of inner parity data from an inner parity area 450 for inner-code error-correction coding.

Figure 5:
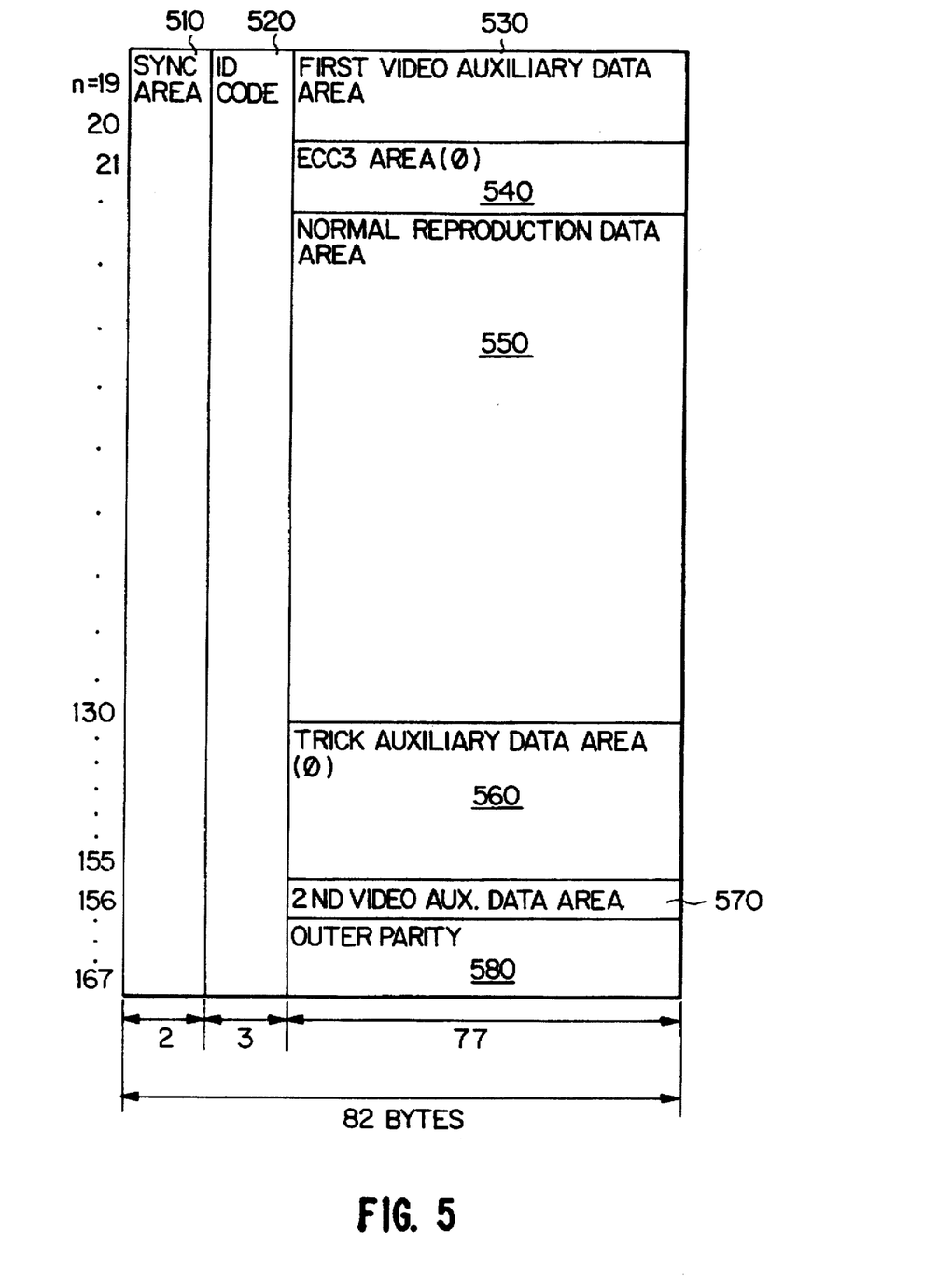
FIG. 5 illustrates outer error-correction coding carried out in the outer ECC coder shown in FIG. 2 for the structure of data sync blocks shown in FIG. 3.

FIG. 5 illustrates the result of carrying out outer error-correction coding by outer ECC coder 40 shown in FIG. 2 for the data sync block structure shown in FIG. 3.

The data sync block structure shown in FIG. 5 includes sync blocks (n=19,20) as a first video auxiliary data area 530, sync blocks (21~30) as an error-correction coding area (ECC3) 540, sync blocks (51~130) as a normal reproduction data area 550, sync blocks (131~155) as a trick reproduction data area 560, a sync block (156) as a second video auxiliary data area 570, and sync blocks (157~167) as an outer parity 580.

Each sync block includes 2 bytes of sync data from sync area 510, 3 bytes of an identification code 520, and 77 bytes of data.

Here, data in the ECC3 area 540 and trick reproduction data area 560 are temporarily replaced by "0", as shown in FIG. 5. More specifically, during a first outer coding operation, the data in the trick reproducing area 360 is temporarily set to "0" and the normal reproducing data and trick reproducing data are outer coded by first outer ECC coder 41. The resulting error-correction information is to be stored in ECC3 area 340. Next, data in both the trick reproducing area 560 and ECC3 area 540 are temporarily set to "0", and second outer ECC coder 42 performs a second outer ECC coding operation on 138 sync blocks comprising the first video auxiliary data area 530, ECC3 area 540, normal reproducing data area 550, trick reproducing area 560 and second video auxiliary data area 570. The resulting error correction data from the second outer ECC coding operation is stored in the outer parity area 580, thereby adding 11 sync blocks of the outer parity area 530 to the 138 other sync blocks. The resulting error-correction information generated by first outer ECC coder 41 can then be stored in the ECC3 data area.

Figure 6:
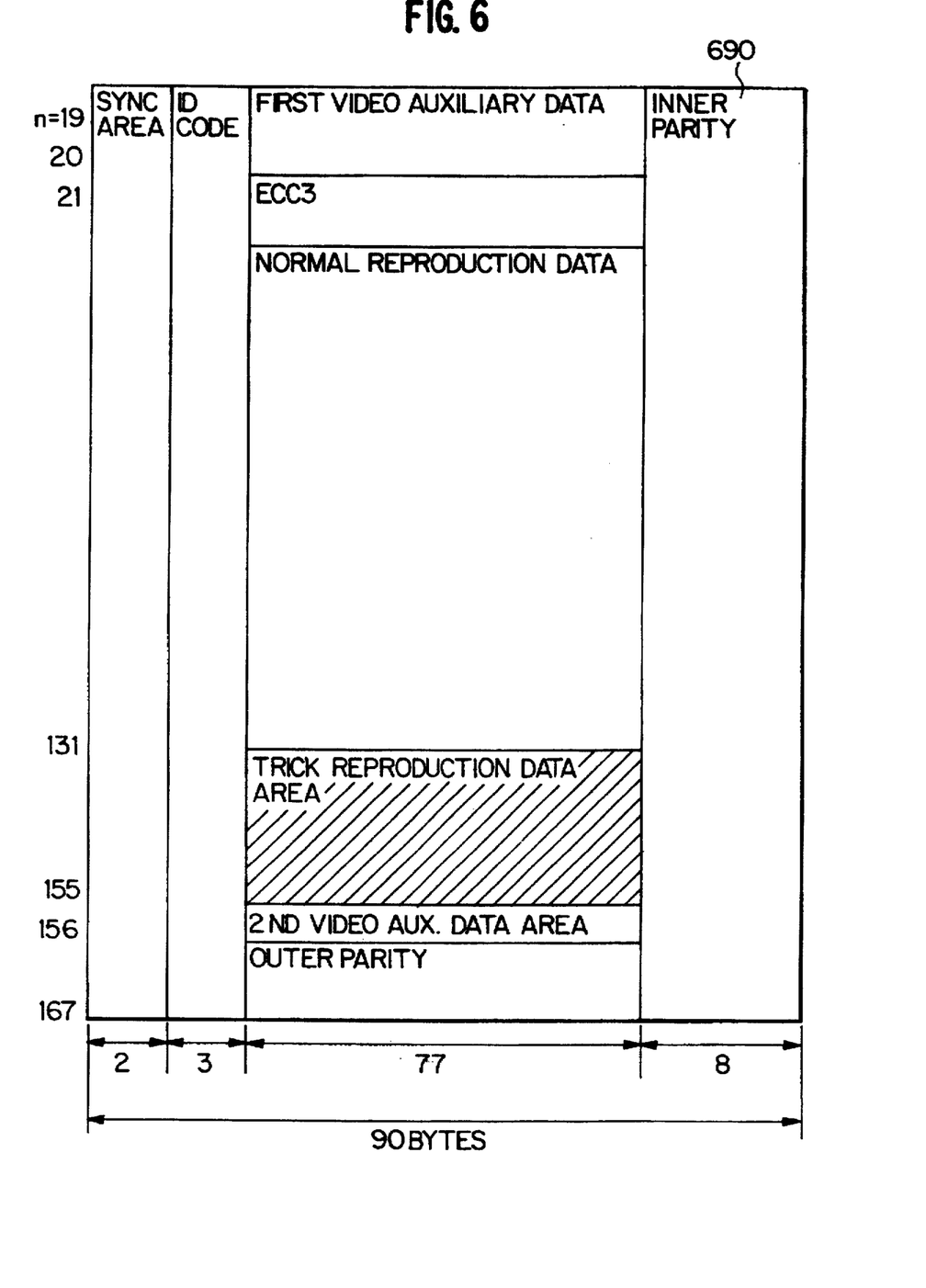
FIG. 6 illustrates inner error-correction coding carried out in the inner ECC coder shown in FIG. 2 for the structure of data sync blocks shown in FIG. 3.

FIG. 6 illustrates the result of carrying out an inner error-correction coding operation in inner ECC coder 50 shown in FIG. 2 for the data sync block structure shown in FIG. 3, in which the data structure is the same as that shown in FIG. 3.

Figure 7:
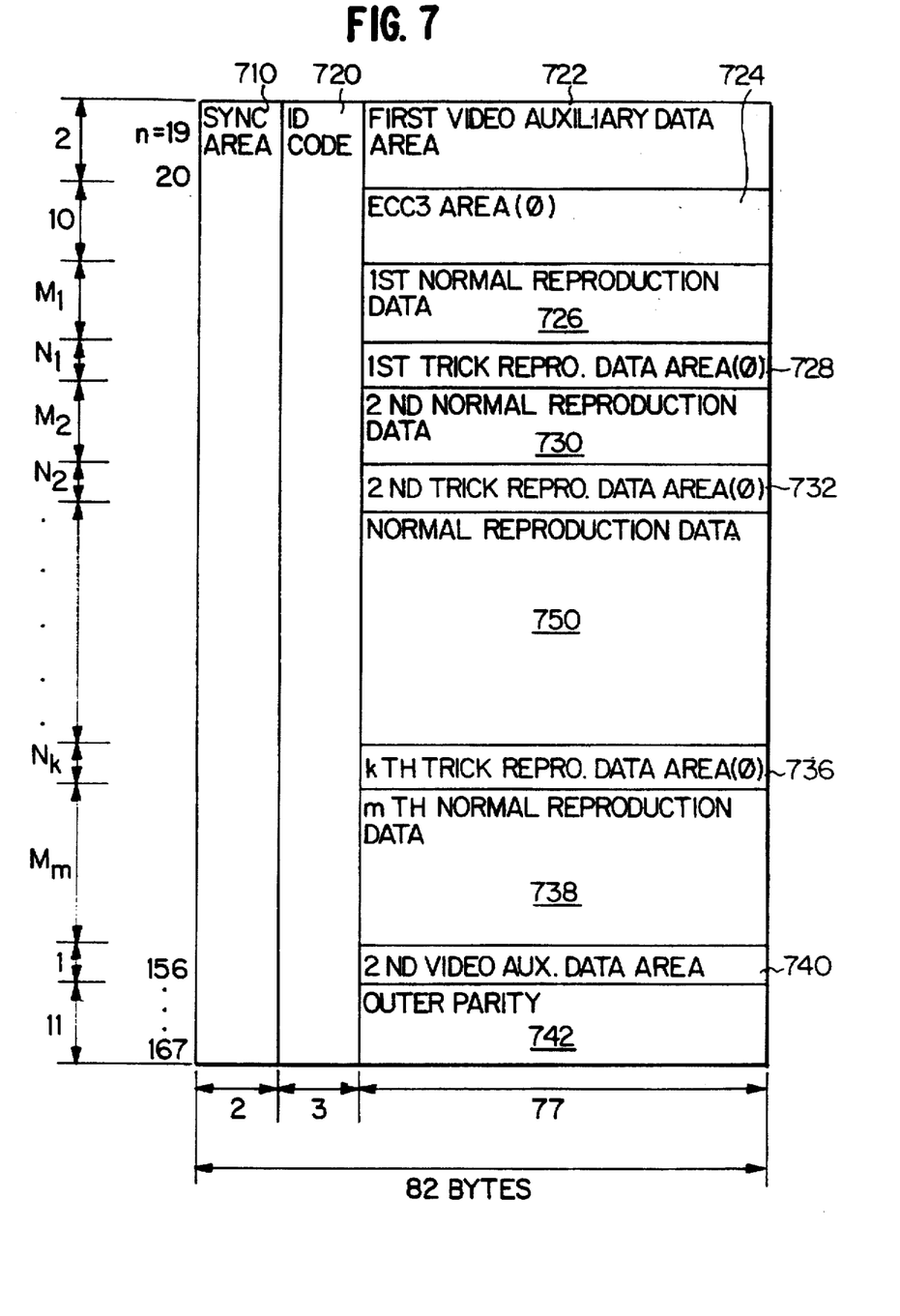
FIG. 7 illustrates outer error-correction coding carried out in the outer ECC coder shown in FIG. 2 for the structure of data sync blocks shown in FIG. 4.

FIG. 7 illustrates the result of carrying out the outer error-correction coding operation by the outer ECC coder 40 shown in FIG. 2 for the data sync block structure shown in FIG. 4.

FIG. 7 includes sync blocks (n=19 and 20) as a first video auxiliary data area 722, N sync blocks as first through kth trick reproduction data area 728, 732, and 736 (i.e., $N_1 \ldots N_k$, where $N=N_1+N_2+\ldots +N_k$), sync blocks (21~30) as an error-correction coding (ECC3) area 724 as normal reproduction data areas 726, 730, 750 and 738, M sync blocks as first through mth normal reproduction data areas 726, 730, 750 and 738 (i.e., $M_1 \ldots M_m$, where $M=M_1+M_2+\ldots +M_m$), a sync block (156) as a second video auxiliary data area 740, and sync blocks (157~167) as an outer parity (information) area 742, in which N+M=125.

Each sync block includes 2 bytes of sync data from sync area 710, 3 bytes of an identification code 720, and 77 bytes of data.

Here, data in the ECC3 area 724 and trick reproduction data areas 728, 732 and 736 are temporarily replaced by "0", as shown in FIG. 7. More specifically, during a first outer coding operation the data in the trick reproducing areas 728, 732 and 736 is temporarily set to "0" and the normal reproducing data and trick reproducing data are outer coded by first outer ECC coder 41. The resulting error-correction information is to be stored in ECC3 area 424. Next, data in both the trick reproducing areas 728, 732 and 736, and ECC3 area 724 are temporarily set to "0", and second outer ECC coder 42 performs a second outer ECC coding operation on 138 sync blocks comprising the first video auxiliary data area 722, ECC3 area 724, M normal reproducing data areas 726, 730, 750 and 738, trick reproducing areas 728, 732 and 736 and second video auxiliary data area 740. The resulting error correction data from the second outer ECC coding operation is stored in the outer parity area 742, thereby adding 11 sync blocks of the outer parity area 742 to the 138 other sync blocks. The resulting error-correction information generated by first outer ECC coder 41 can then be stored in the ECC3 data area.

Figure 8:
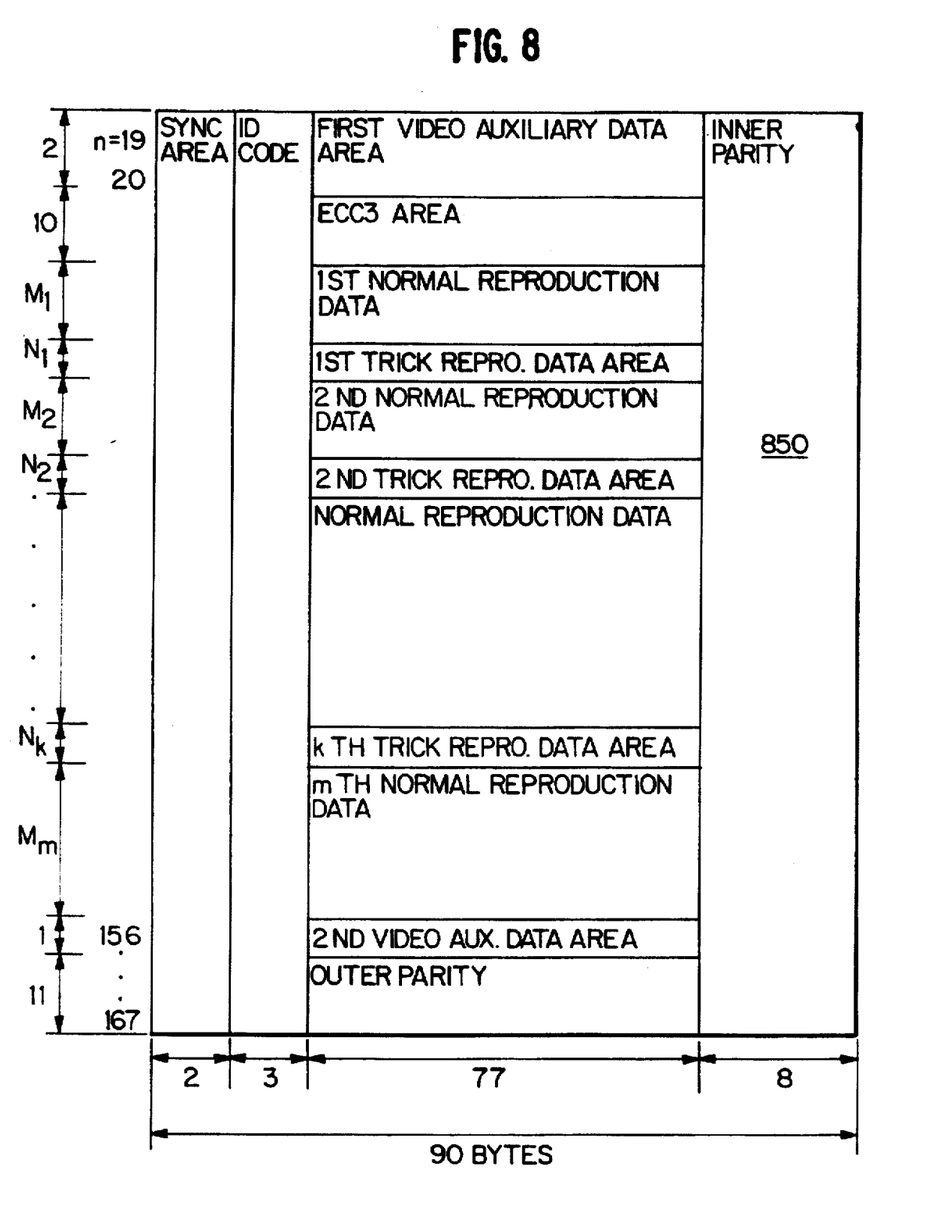
FIG. 8 illustrates inner error-correction coding carried out in the inner ECC coder shown in FIG. 2 for the structure of data sync blocks shown in FIG. 4.

FIG. 8 illustrates the result of carrying out inner error-correction coding by the inner ECC coder shown in FIG. 2 for the data sync block structure shown in FIG. 4.

Figure 9:
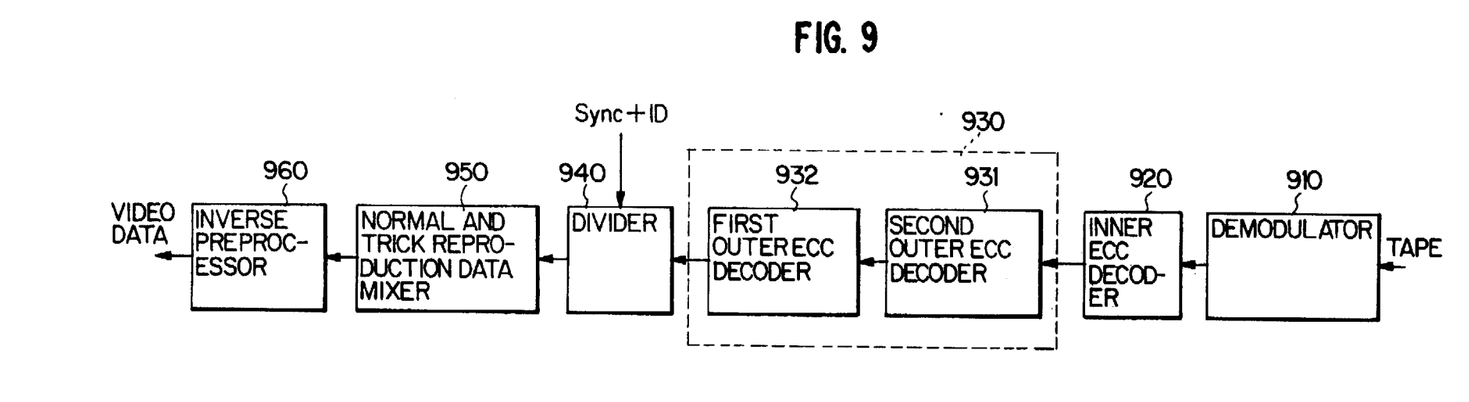
FIG. 9 is a block diagram of an ECC decoder for carrying out a digital videotape reproduction method according to an embodiment of the present invention.

FIG. 9 is a block diagram of an example decoder for carrying out the digital videotape reproduction method according to the present invention. The ECC decoder shown in FIG. 9 includes a demodulator 910 for demodulating a signal read from a tape, an inner ECC decoder 920 for performing an inner-code error-correction decoding operation, an outer ECC coder 930 for performing an outer-code error-correction decoding operation and consists of first and second outer ECC decoders 932 and 931, respectively, a divider 940 for separating sync signals and identification codes, a normal and trick reproduction data mixer 950 for mixing normal and trick reproduction data, and an inverse preprocessor 960 for outputting ATV and DVB signals by transmission packeting normal and trick reproduction data.

The digital videotape recording and reproducing method according to the present invention is described below in more detail referring to FIGS. 2 though 9.

In FIG. 2 interframe signal video data having an MPEG-2 structure, preferably in a transport packet structure, is input to preprocessor 10. Preprocessor 10 separates the video data into transport layers based on the transport packet structure.

Transport packet data include video, audio, and user sectors. However, only the video sector is considered in the present invention.

Since a DVCR includes a trick playing function, trick data is extracted from the transmitted MPEG-2 video data. Also, trick data needs to be recorded on a tape after being converted into MPEG-2 video and transport packet structures. The normal and trick reproduction data divider 20 divides the MPEG-2 video data into normal and trick reproduction data, and then outputs that data.

Meanwhile, data input to a DVCR which can record ATV and DVB signals, are intercoded in a GOP unit. In general, this type of data signal includes intracoded picture (I-picture) data which is independently coded, predicted-coded picture (P-picture) data which is coded by using preceding I-picture or P-picture data according to a moving compensation method, and bidirectionally predicted-coded (B-picture) data which is coded by using preceding I-picture or P-picture data and succeeding P-picture data according to a moving compensation method.

In one embodiment of the present invention, an sequence or order for display of an ATV signal, determined according to MPEG-2, is: I—B—B—P—B—B—P—B—B—P—B—B—P - - -, and a sequence or order for transmission is: I—P—B—B—P—B—B—P—B—B—P—B—B—P - - - .

Therefore, intraframe data, capable of being independently coded, are selected and used for trick reproduction data. Among the intraframe data, only a few coefficients (in general, a DC coefficient and 1~2 AC coefficients per block) of intraframe data are selected and transmitted according to an MPEG-2 structure.

An SD-VCR video area is recorded using the same format as shown in FIG. 1. However, for an ATV signal, the video area is recorded in a subdivided manner as shown in FIGS. 3 and 4. In FIGS. 3 and 4, the video sector includes trick reproduction data areas 360, 428, 432 and 436, and ECC3 areas 340 and 424. Since the MPEG-2 data stream is an intercoded bit stream, it is vulnerable to errors. Therefore, additional error-correction code is needed in an SD-VCR.

Mixer 30 mixes sync codes and identification codes of normal and trick reproduction data output from the normal and trick reproduction data divider 20. Also, as shown in FIGS. 4 and 5, the mixer 30 separately inputs normal and trick reproduction data.

The outer and inner ECC coders 40 and 50 carry out error-correction coding for data output from the mixer 30. The code preferably used for error-correction coding is a two-dimensional Reed-Solomon code. The primitive polynomial of the error-correction code is, for example, $P(x)= x^8+x^4+x^3+x^2+1$.

Outer ECC coder 40 includes first and second outer ECC coders 41 and 42. Examples of equations for generating polynomials used in first and second outer ECC coder 41 and 42 are $g(x)=(x+1)(x+a)(x+a^2) \ldots (x+a^{10})$ and $g(x)=(x+1)(x+a)(x+a^2) \ldots (x+a^9)$, respectively.

The first outer ECC coder 41 carries out error-correction coding according to a (135, 125) structure by adding to the data 10 bytes of an ECC3 code. In other words, when error-correction outer coding is performed by first outer ECC coder 41 the amount of pure data and parity data are 125 and 10 bytes, respectively (i.e., 125 bytes of pure data and 10 bytes of parity data). Here, the pure data corresponds to the normal reproducing data and trick reproducing data. As shown in FIG. 3, trick data area 360 consists of N sync blocks which exist within the 125 sync blocks of pure data. Also the error-correction code area (ECC3) 340 (9 sync blocks), which is an additional error-correction code area, is for storing only error-correction data relating to the normal reproduction data.

Therefore, for the data structure shown in FIG. 3, error-correction coding is carried out by temporarily setting N sync blocks of trick reproduction data area 360 to a value of "0" or to a predetermined data pattern, as shown in FIG. 5, performing error correction outer coding with the first outer ECC coder 41 thereby generating parity data, and then adding the generated parity in ECC3 area 340.

For the data structure shown in FIG. 4, error-correction coding is carried out by temporarily setting the first through the kth trick reproduction data areas 428, 432 and 436 to have values of "0" or to a predetermined data pattern, as shown in FIG. 7, performing outer error-correction coding with the first outer ECC coder 41 thereby generating error correction information, and then adding the generated error-correction information in ECC3 area 724.

The second outer ECC coder 42 carries out error-correction coding according to a (149, 138) structure by adding an SD-VCR outer-code parity, i.e., outer parity area 390 shown in FIG. 3 to the pure data. However, the outer parity area stores parity information only for normal reproduction data. In other words, when performing error-correction coding with second outer ECC coder 42, the amount of pure data and parity are 138 and 11 bytes, respectively. As shown in FIG. 3, trick data area 360 of N sync blocks exists within the 138 bytes of sync data for the pure data.

Therefore, for the data structure shown in FIG. 3, error-correction coding is carried out by temporarily setting N sync blocks of trick reproduction data area 360 and sync blocks of ECC3 area 340 to have a value of "0" or to a predetermined data pattern, and then by adding the generated parity, or error-correction, information to outer parity area (11 sync blocks) 380, as shown in FIG. 5. The original data values for the trick reproduction data area and the ECC3 area can then be restored.

For the data structure shown in FIG. 4, second outer error-correction coding is carried out by replacing the data in first through kth trick reproduction data areas 428, 432 and 436, and ECC3 area 424 with "0" or with a predetermined data pattern, performing the error-correction coding operation and then adding the resulting parity or error-correction, information to outer parity area (11 sync blocks) 442, as shown in FIG. 7. The original data values for the trick reproduction data areas and the ECC3 area can then be restored.

Therefore, if, in performing error-correction coding with outer ECC coder 40, including first and second outer ECC coders 41 and 42, N sync blocks of trick reproduction data and 10 sync blocks as ECC3 area are coded by being replaced with a predetermined number such as "0", or by a regular data pattern or numbers, the error-correction capability in a normal reproduction procedure can be increased by the present invention in which 11 bytes of outer parity are added for error-correction coding of only normal reproduction data, compared to that in a conventional method in which 11 bytes of outer parity are added for error-correction coding of all the 138 bytes of data.

In other words, in a conventional method when an extra error-correction decoding operation is performed during normal reproduction, 11 bytes of parity information are added to 138 bytes of data. However, in the present invention error correction is carried out by adding 11 bytes of parity information to the pure normal reproduction data area, excluding data in trick reproduction areas and the ECC3 area (e.g., 138-N-10 sync blocks) and 3 bytes of video auxiliary data area, thereby increasing the error correction rate without requiring a large modification to the hardware.

In another embodiment the order of first and second outer-code error correction coders 41 and 42 are exchanged.

In inner ECC coder 50, 8 bytes of inner parity information 390 are added to 77 bytes of data, similar to the conventional method, as shown in FIG. 6. Here, an inner code generating polynomial used in inner-code error correction coder 50 is $g(x)=(x+1)(x+a)(x+a2) \ldots (x+a^7)$.

In the case of the data structure shown in FIG. 4, inner ECC coder 50 adds 8 bytes of the inner parity information 450 to 77 bytes of data as shown in FIG. 8, as in the conventional method.

Therefore, when inner-code parity information 690 and 850 are generated, as shown in FIGS. 6 and 8, respectively, they are generated based on data in each of the ECC3, normal, trick, auxiliary, and outer parity data areas.

Video data corrected in error correction coders 40 and 50 is modulated by modulator 60 to be recorded on a videotape.

FIG. 9 is a block diagram of an example of an ECC decoder for performing the digital videotape recorder reproduction method according to the present invention.

The reproducing method for reproducing data from a digital videotape using the ECC decoder shown in FIG. 9, reproduces the data from the videotape in reverse order from the recording method of the encoder shown in FIG. 2. A demodulator 910 demodulates reproduction data from the videotape having the modulated signal.

In the inner ECC decoder 920, an inner-code error-correction decoding operation is carried out for both normal and trick reproduction data output from demodulator 910.

In the second outer-code error-correction decoder 931, an outer ECC decoding operation is carried out for normal and trick reproduction data after data in the trick reproduction data area is replaced with a value of "0" or with a predetermined data pattern.

In the first outer ECC decoder 932, an outer-code error-correction decoding operation is carried out for normal and trick reproduction data and ECC3 data after data in the trick reproduction data and the ECC3 area is replaced with a value of "0" or with a predetermined data pattern.

In a divider 940, sync and identification codes are separated from normal and trick reproduction data output from error-correction decoders 930 and 920.

In a normal and trick reproduction data mixer 950, normal and trick reproduction data are separated using sync and identification code outputs from the divider 940, and mixed again according to a normal or a trick reproduction mode. In the inverse preprocessor 960, mixed normal and trick reproduction data are converted into a transport packet to be output as an ATV or a DVB signal.

As described above, since in an SDNCR for reproducing ATV and DVB signals according to the present invention an outer ECC coding operation is performed for normal and trick reproduction data after data in trick reproduction and additionally allocated ECC3 data areas are replaced by a predetermined number or a predetermined data pattern, the error correction capability can be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for recording on a videotape intercoded video data including picture data, which are supplied at a predetermined interval and capable of being independently decoded, by dividing the data into normal and trick reproduction data, and allocating an ECC3 area at a predetermined position in which the normal reproduction data is recorded, and storing error correction information relating to the normal reproduction data, comprising:

first outer-code error-correction coding of the normal reproduction data after setting the trick reproduction data and data in the ECC3 area with a first predetermined data pattern, thereby generating and adding first outer-code error-correction data to an outer parity area;

second outer-code error-correction coding of the normal reproduction data after setting the trick reproduction data coded in said first outer-code error-correction coding step and additional ECC3 area data to a second predetermined data pattern, thereby generating and adding second outer-code error-correction data to the ECC3 area;

inner-code error-correction coding each of the normal and the trick reproduction data coded by the first and second outer-code error-correction steps, thereby generating and storing inner-coded error correction data in an inner parity area; and modulating and recording the normal and trick reproduction data and ECC3 area data of the inner-coded error correction data at predetermined locations on a track of the videotape.

2. The method for recording intercoded video data on a videotape as claimed in claim 1, wherein one of said first and second predetermined data patterns is comprised of predetermined integer data.

3. The method for recording intercoded video data on a videotape as claimed in claim 2, wherein the other of said first and second predetermined data patterns is comprised of predetermined integer data.

4. A method for recording on a videotape intercoded video data including picture data, which are supplied at a predetermined interval and capable of being independently decoded, by dividing the data into normal and trick reproduction data, and allocating an ECC3 area at a predetermined position in which the normal reproduction data area is recorded, and storing error correction information relating to the normal reproduction data, comprising the steps of:

first outer-code error-correction coding of the normal reproduction data after setting the trick reproduction data with a first predetermined data pattern and then generating and adding first outer-code parity information in the ECC3 area;

second outer-code error-correction coding of the normal reproduction data after setting the trick reproduction data coded in said first outer-code error-correction coding step, and an data in the ECC3 area with a second predetermined data pattern, and then generating and adding outer parity information in an outer parity area;

inner-code error-correction coding of each of the normal and the trick reproduction data coded by the second outer-code error-correction coding step; and modulating and recording the normal and trick reproduction data and ECC3 area data, coded in the inner-code error-correction coding step in a predetermined location of a track on the videotape.

5. The method for recording intercoded video data on a videotape as claimed in claim 4, wherein one of said first and second predetermined data patterns is predetermined integer data.

6. The method for recording intercoded video data on a videotape as claimed in claim 5, wherein the other of said first and second predetermined data patterns is comprised of predetermined integer data.

7. A digital videotape reproducing method for reproducing normal and trick reproduction data recorded in a video sector on a videotape, comprising:

inner-code error-correction decoding of each of the normal and trick reproduction data;

second outer-code error-correction decoding of the normal and trick reproduction data decoded in said inner-code correction decoding step after replacing the trick reproduction data with a first predetermined data pattern;

first outer-code error-correction decoding of the normal and trick reproduction data decoded in said second outer-code error-correction decoding step after replacing the trick reproduction data and data in an ECC3 area with a second predetermined data pattern; and mixing the normal and trick reproduction data decoded in said first outer-code error-correction coding step to output a video signal.

8. The digital videotape recording method as claimed in claim 7, wherein one of said first and second predetermined data patterns is predetermined integer data.

9. The method for recording intercoded video data on a videotape as claimed in claim 8, wherein the other of said first and second predetermined data patterns is comprised of predetermined integer data.

10. A digital videotape reproducing method for reproducing normal and trick reproduction data recorded in a video sector on a videotape, comprising:

inner-code error-correction decoding of each of the normal and trick reproduction data;

first outer-code error-correction decoding of the normal and trick reproduction data decoded in said inner-code correction decoding step after replacing the trick reproduction data and the ECC3 area data with a first predetermined data pattern;

second outer-code error-correction decoding of the normal and trick reproduction data decoded in said first outer-code error-correction decoding step after replacing the trick reproduction data with a second predetermined data pattern; and mixing the normal and trick reproduction data decoded in said second outer-code error-correction coding step to output a video signal.

11. The digital videotape recording method as claimed in claim 10, wherein one of said first and second predetermined data patterns is predetermined integer data.

12. The method for recording intercoded video data on a videotape as claimed in claim 11, wherein the other of said first and second predetermined data patterns is comprised of predetermined integer data.

* * * * *